United States Patent
Carlson

[11] 3,840,938
[45] Oct. 15, 1974

[54] POULTRY PICKING MACHINES
[75] Inventor: Franklin J. Carlson, Okauchee, Wis.
[73] Assignee: C & C Products, Inc., Pewaukee, Wis.
[22] Filed: Mar. 23, 1971
[21] Appl. No.: 127,175

Related U.S. Application Data
[63] Continuation-in-part of Ser. No. 800,845, Feb. 20, 1969, abandoned.

[52] U.S. Cl............................................. 17/11.1 R
[51] Int. Cl............................................. A22b 3/08
[58] Field of Search................................. 17/11.1 R

[56] References Cited
UNITED STATES PATENTS

| | | | |
|---|---|---|---|
| 2,337,201 | 12/1943 | Johnson | 17/11.1 R |
| 2,528,215 | 10/1950 | Doupnik | 17/11.1 R |
| 2,562,681 | 7/1951 | Pine | 17/11.1 R |
| 2,578,930 | 12/1951 | Hanshaw | 17/11.1 R |
| 2,581,183 | 1/1952 | Galamb | 17/11.1 R |
| 2,596,780 | 5/1952 | Meyers et al. | 17/11.1 R |

Primary Examiner—Louis G. Mancene
Assistant Examiner—Donald Weinhold
Attorney, Agent, or Firm—Arthur L. Morsell, Jr.

[57] ABSTRACT

In a poultry feather-removing machine of the type including rotary drums having flexible feather-picking fingers projecting radially therefrom, novel finger-mounting devices are carried on the exterior surface of the drum, said devices being so designed that the novel base portions of the picking fingers can be quickly and easily snapped into and out of mounting engagement from the exterior to speed and facilitate the task of installing said fingers and of removing and replacing them when they become worn. In addition, said exterior mounting devices permit the use of wider, more effective picking fingers than can be employed with conventional mounting assemblies.

14 Claims, 21 Drawing Figures

INVENTOR
FRANKLIN J. CARLSON

BY

*Morsell & Morsell*

ATTORNEYS

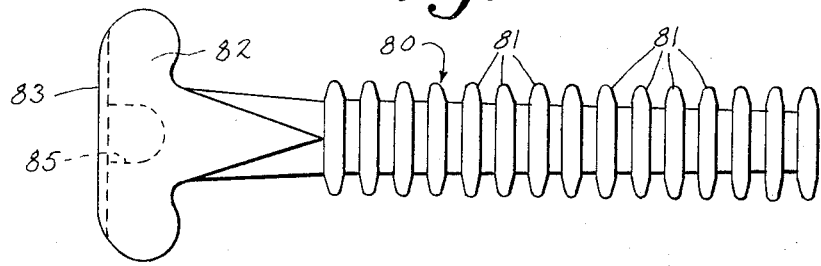
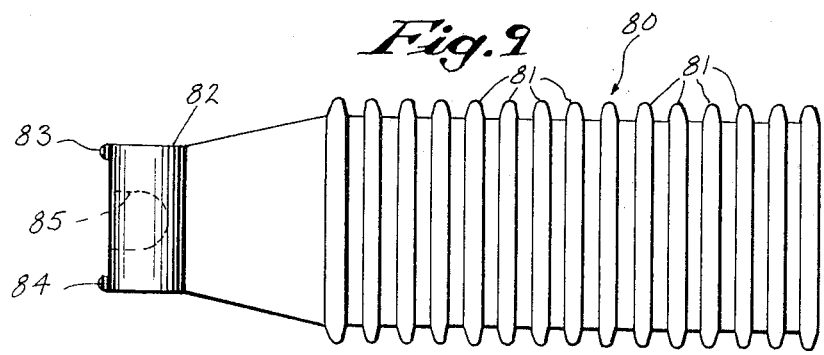
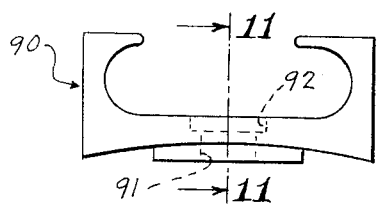 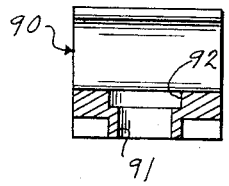 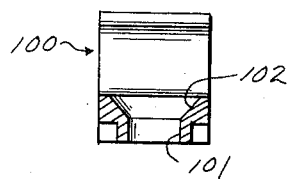
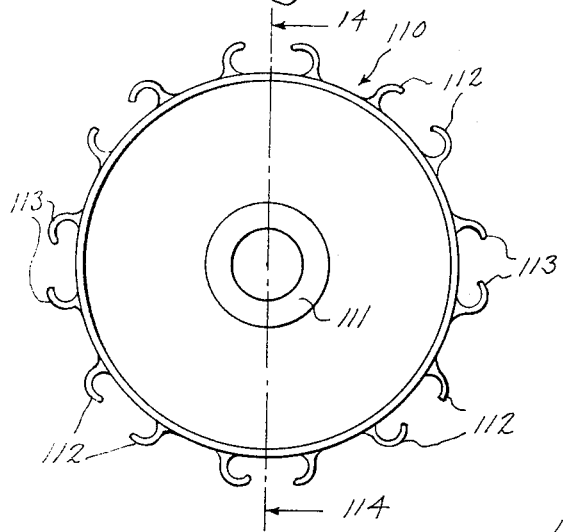 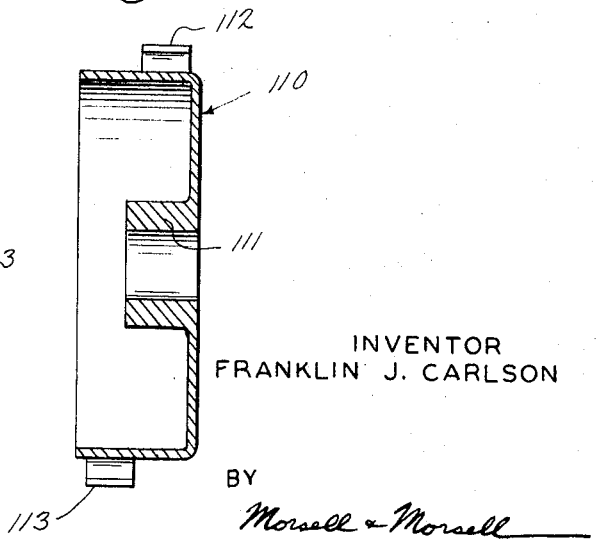
INVENTOR
FRANKLIN J. CARLSON

INVENTOR
FRANKLIN J. CARLSON

BY

Morsell & Morsell

ATTORNEYS

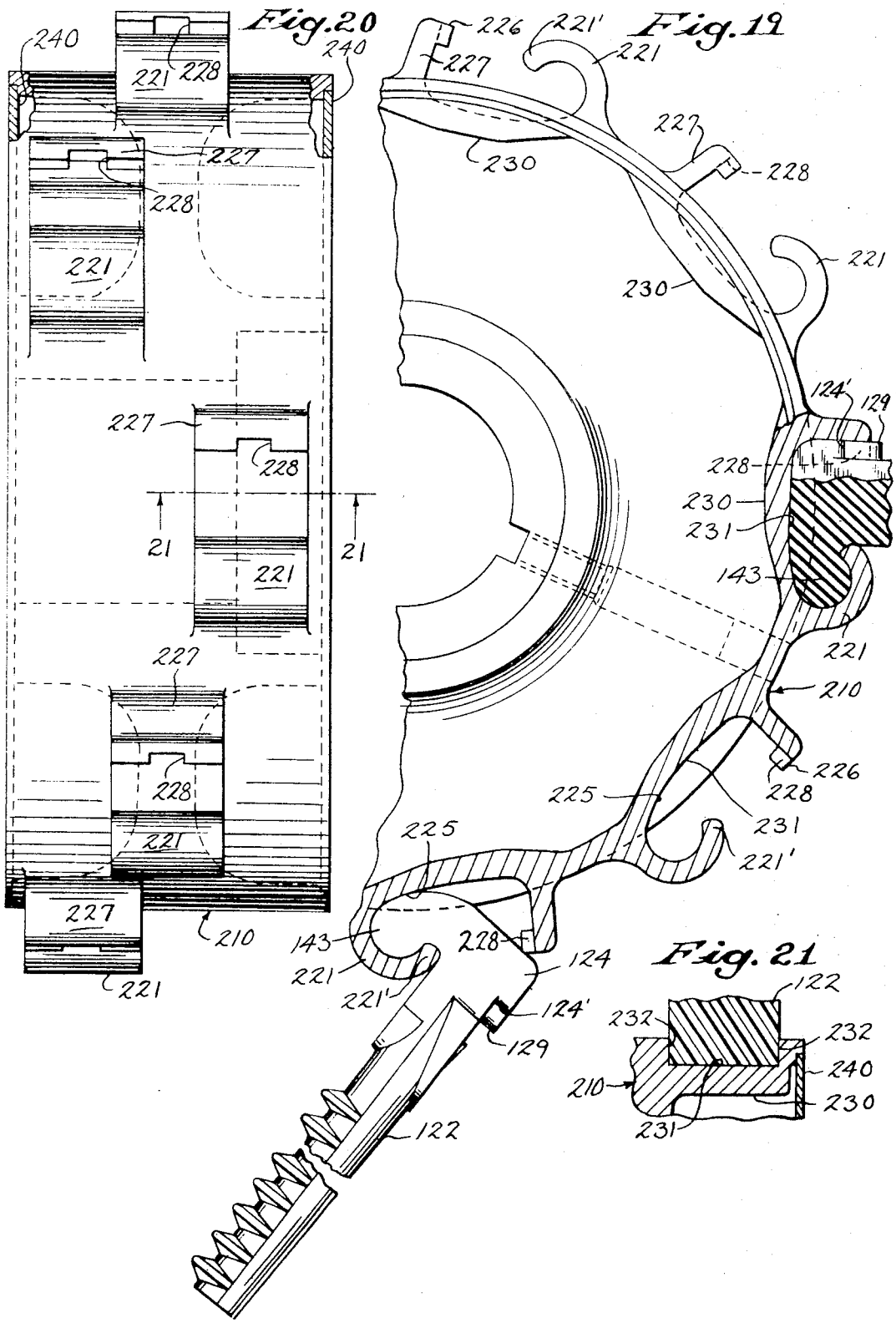

POULTRY PICKING MACHINES

This is a continuation-in-part of application Ser. No. 800,845, filed Feb. 20, 1969 now abandoned.

BACKGROUND OF THE INVENTION

1. Field of the Invention

The present invention relates to poultry feather-picking machines, and more particularly to improved picking fingers and finger-mounting assemblies for such machines.

2. Description of the Prior Art

Conventional poultry feather-picking machines ordinarily consist of two adjacent rows of aligned and closely spaced open-ended rotary drums having a plurality of flexible picking fingers projecting radially therefrom which are adapted to engage and remove the feathers from a chicken or other fowl conveyed between said rows of rotating drums. The picking fingers employed in such machines are ordinarily formed of rubber or similar flexible and resilient material and each is provided with an enlarged base with an annular shoulder spaced immediately thereabove.

To install a picking finger of the conventional type on a drum the picking finger is inserted through the open end of the drum and manually urged outwardly through one of the small apertures provided therefor in the drum periphery, said finger being forcibly pushed outwardly until the annular shoulder thereon snaps past said drum hole and the enlarged base thereon clampingly abuts against the drum inner surface. As hereinabove mentioned, however, said aligned drums are mounted in closely spaced relationship, and it is an exceedingly difficult task for a workman to insert his hand therebetween and to thread a picking finger outwardly through one of the relatively small drum holes. As a result, the installation and removal of said picking fingers is a tedious and time-consuming job.

Another shortcoming of conventional picking finger mounting assemblies is that the width or diameters of the fingers is limited by the size of the drum holes, since said fingers must be pushed partially through said holes during their installation, as described. It has long been recognized that flexible picking fingers having a greater surface area for engagement with the fowl would have improved feather-picking capabilities, but heretofore said fingers have been restricted in width, as described. Examples of prior poultry picking machines and fingers of the type above described are disclosed in the following U.S. Pat. Nos.: Barker, et al., 2,914,794; Barker 2,559,001; and Wolfinger 2,595,435.

The Pine U.S. Pat. No. 2,562,681 discloses poultry picking fingers which must be separated inserted through holes in a separate rigid base member which is of a length equal to the width of the drum, it being necessary to slide the separable base member into a channel on the outside of the drum after all of the fingers in the row have been assembled in the base, and it then being necessary to use nuts and bolts which extend through to the interior of the drum to secure the rigid base member in mounted position. Thus individual fingers cannot be separately installed and removed but only rows of fingers mounted on a common base, and then it is necessary to gain access to the interior of the drum to release the common base.

The Galamb U.S. Pat. No. 2,581,183 discloses various ways of mounting fingers on drums, but all of these devices are complicated and require metallic holding devices as a part of the base of the finger which must be removed with the finger. In none of these devices can a flexible finger base be snapped into and out of holding devices which are attached to the drum.

SUMMARY OF THE INVENTION

The present invention provides an improved picking finger and mounting assembly for use in rotary drum-type poultry picking machines, which assembly includes finger-mounting devices on the drum surface to permit the separable attachment of the picking fingers exteriorly of the drum without the use of bolts, nuts or like fastening elements. The result is that with the present invention there is no necessity for manually inserting the picking fingers into the drum interior and then tediously threading them outwardly through relatively small holes provided therefor in said drum, as is the conventional practice. The quick detachable mounting of the picking fingers exteriorly of the drum in the present invention without the use of separate fastening elements greatly facilitates the removal and replacement of said fingers when necessary, as well as permitting the use of wider, more effective picking fingers than can be employed with conventional finger mounting assemblies.

A further object of the invention is to provide, in a poultry picking machine having a rotary drum with a peripheral surface, sets of spaced finger mounting legs projecting outwardly from said surface, each pair of said legs being shaped to snappingly receive the resilient bases of picking fingers to releasably hold the same in position, and there preferably being additional cooperating means between the finger base and the drum for preventing lateral displacement of the fingers from between the legs.

A further object of the present invention is to provide as one form of the invention a new and improved picking finger and mounting bracket assembly that can be included as standard equipment on new poultry picking machines, and which can also be readily installed on existing picking machines to improve the same.

A further object of the invention is to provide an improved picking finger and mounting assembly which in one form of the invention includes mounting devices which are formed integrally with the drum on each end of a surface recess, each surface recess being bounded on the sides by laterally spaced shoulders to prevent accidental displacement of a finger base out of the holding devices, said form of the invention making it possible to close the ends of the drum to maintain the interior sanitary.

Still further objects of the present invention are to provide a novel and improved picking finger assembly for rotary drum-type poultry picking machines which is simple and relatively inexpensive in design, which is reliable in use, and which is otherwise particularly well adapted for its intended purposes.

BRIEF DESCRIPTION OF THE DRAWINGS

In the accompanying drawings, wherein the same reference numerals designate the same or similar parts in all of the views:

FIG. 8 is a side elevational view of another modified picking finger design;

FIG. 9 is a top plan view of the finger shown in FIG. 8;

FIG. 10 is a side elevational view of another mounting bracket style within the scope of the invention;

FIG. 11 is a transverse sectional view through said mounting bracket taken along line 11—11 of FIG. 10;

FIG. 12 is a similar transverse sectional view through still another style mounting bracket;

FIG. 13 is a side elevational view of a drum having finger-mounting brackets formed integrally thereon;

FIG. 14 is a transverse sectional view through said modified drum taken long line 14—14 of FIG. 13;

FIG. 19 is a fragmentary end view of a drum showing the finger-holding devices formed integrally with the drum and showing a portion of fingers in various positions, the end plate being omitted;

FIG. 20 is a view looking at the periphery of the drum of FIG. 19, parts being broken away; and FIG. 21 is a fragmentary sectional view taken on the line 21—21 of FIG. 20 showing a finger base in position.

DESCRIPTION OF THE PREFERRED EMBODIMENTS

Figure 1:
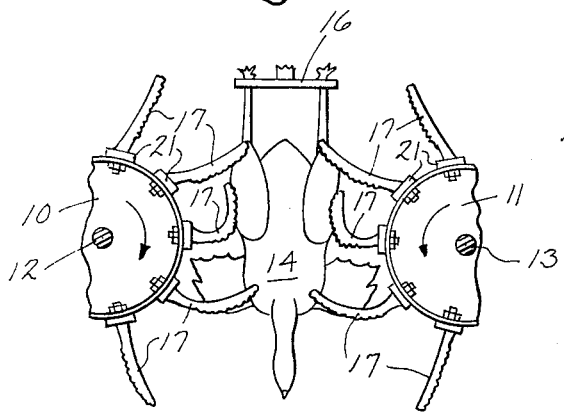
FIG. 1 is a fragmentary elevational view of a poultry picking machine featuring the improved picking finger mounting assembly.
Figure 2:
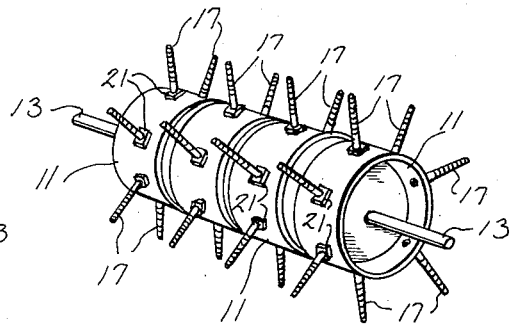
FIG. 2 is a perspective view showing one of the rows of rotary drums employed in the machine.

Referring now more particularly to FIGS. 1 and 2 of the drawing, poultry feather-picking machines of the type herein concerned ordinarily include two parallel rows of closely spaced drums 10 and 11 which are mounted on power-driven rotatable shafts 12, 13, respectively. As appears in FIG. 1, said drum rows are spaced apart a distance sufficient to permit a chicken 14 or other fowl to be conveyed therebetween, said fowl being suspended by either its feet or neck from an overhead conveyor 16 adapted to traverse the length of said picking apparatus.

As will be hereinafter described in greater detail, a plurality of flexible picking fingers 17 project radially outwardly from the drums 10, 11, with adjacent fingers preferably being offset relative to each other. During the operation of the machine said drums are rotated in opposite directions, the flexible fingers 17 thereon co- acting to engage and pull the fethers from the fowl 14 passing therebetween. By the time the fowl reaches the end of the line of rotary drums substantially all of the feathers have been picked therefrom. While the improved picking finger and mounting assembly comprising the present invention is intended primarily for automatic, power-driven machines of the type generally employed in commercial fowl processing operations, it is to be understood that said invention could also be advantageously utilized in the less common manually operated plucking machines, and the invention is by no means to be limited or confined in this respect.

In the use of fowl picking machines of the type described, the picking fingers 17, which are formed of rubber or similar flexible material, become worn after extended use and must be replaced. Particularly at the forward end of the drum rows, where the quantity of feathers removed is the greatest, the wear of said fingers is pronounced. Consequently, it is a customary practice to periodically remove and replace said fingers, or to reposition said forward picking fingers at the rearward end of the drum rows, where it is desirable to utilize fingers that are somewhat worn so that they will not bark or bruise the skin of the substantially defeathered fowl.

As hereinabove mentioned, the drums in each row are mounted in closely spaced relationship. With the use of conventional picking fingers which must be manually inserted into the drums and forced outwardly through relatively small holes provided therefor in said drums it is a difficult and time-consuming task for the workman to install said fingers. It is to facilitate this task that the novel finger mounting assembly comprising the present invention has been designed, as will now be described.

Figure 3:
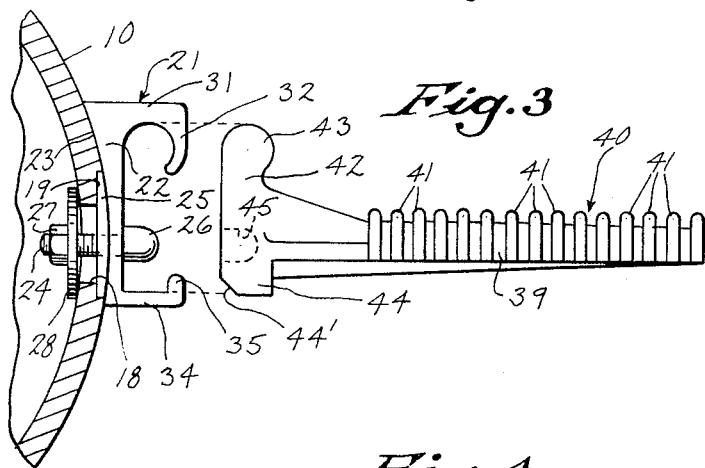
FIG. 3 is a side elevational view of one form of picking finger and mounting bracket within the scope of the invention.

With reference now to FIG. 3 of the drawings, illustrated therein is one form of picking finger and mounting bracket assembly characterizing the present invention. As will be seen, the rotary drum 10 has a hole 18 therethrough, which is one of the finger mounting holes provided in conventional poultry picking drums, while formed as an extension of said hole 18 is an elongated keyway slot 19 opening in the outer surface of the drum.

In accordance with the present invention of FIG. 3 there is mounted on the exterior surface of the drum 10 a bracket 21 having a base portion 22 provided with a concave undersurface 23 conforming to the arcuate contour of said drum. Protruding from said bracket undersurface is a lug 25 which is designed to fit closely within the aforementioned drum keyway slot 19 to prevent said bracket for turning. The keyway slots in existing drums may vary somewhat in size and shape, and for this reason the brackets featured in the present invention will be provided with a corresponding variety of lug sizes and shapes.

Projected through a bore provided therefor in the bracket base 22 is a bolt or machine screw 24 having a rounded head 26 protruding from the bracket surface, the threaded shank portion of said bolt projecting into the drum interior and having an enlarged washer 28 and hex nut 27 mounted thereon to clampingly retain the bracket on the drum.

Said bracket 21 is provided with opposed legs 31, 34 having inturned flanges or lips 32, 35 thereon, which legs define an open-sided cavity or socket adapted to removably receive the base portion of a picking finger, as will now be described.

The picking finger 40 illustrated in FIG. 3 is formed of rubber or similar flexible and resilient material, said finger including a base portion 42 and shank 39 on which there are formed a plurality of protruding laterally extending ribs 41. In the feather-picking operation said shank 42 flexes when in contact with the fowl, and the protruding ribs 41 thereon function to engage the feathers and pull them free as said finger moves across the body of the bird, as is well known in the art.

The base portion 42 of said picking finger 40 is provided with an enlarged, curved toe 43 adapted to fit closely within the cavity or socket formed by the bracket leg 31, 32, while the opposite end of said base 42 is provided with a heel portion 44 designed to closely fit beneath the opposite bracket leg 34, 35. A recessed opening 45 in said base is designed to receive the rounded head portion 26 of the bracket-retaining bolt 24 when the picking finger is mounted in said bracket, thereby preventing said finger from shifting laterally and possibly inadvertently working out of said open-sided bracket.

To install the picking finger 40 in the bracket 21 in the present invention the toe portion 43 of the finger base is first positioned under the bracket leg 31, 32. The heel end 44 of said finger base is then positioned against the upper edge of the opposite bracket lip 35 and is forcibly snapped inwardly past said lip, the resilient nature of said rubber finger permitting the same to yield temporarily to snap past said lip and to seat snugly within the socket provided by said opposed bracket legs. When said base has been installed in said bracket, as described, the bolt head 26 projects into the aforementioned base recess 45 to releasably lock said base against lateral movement, thereby preventing said finger base from inadvertently working out one of the open sides of said mounting bracket. A tight fit of the finger base 42 within the mounting bracket is advantageous in the feather-picking operation, and to facilitate the mounting of said closely fitting fingers it is helpful to dip the same in water prior to their installation to reduce friction.

To remove the picking finger 40 from its mounting bracket 21 it is merely necessary to manually forcibly snap the base heel portion 44 past the lip 35, and said base can then be readily withdrawn from the bracket socket. It will be noted that one corner of the base heel portion is beveled, as at 44', and in the event said finger base is too tightly retained within the bracket to be manually separated therefrom a screwdriver or other pry tool can be inserted into said beveled corner opening and used to forcibly pry said base from the bracket. This can be accomplished quickly and easily without damage to either the finger or mounting bracket.

It will be noted that on the mounting bracket illustrated in FIG. 3 the inturned leg portion 32 at the toe end of the bracket is longer than the corresponding leg portion 35 at the opposite bracket end. The drum 10 rotates in a counterclockwise direction, and when the rotating finger 40 strikes the fowl the resulting stresses are initially localized at said bracket toe end. Due to the elongated nature of the leg portion 32, however, the possibility of the picking finger toe being forcibly pulled free of the bracket is minimized. It is to be understood, however, that it is not essential to the present invention that the opposed bracket legs be of unequal lengths. In fact, it is important that said legs be of the same length where a reversible finger installation is desired, as will be hereinafter seen in connection with the embodiments of the invention illustrated in FIGS. 6-10.

As hereinabove mentioned, the principal advantage of the present invention is that the novel mounting brackets 21 permit the picking fingers to be secured on the exterior of the drums, thus eliminating the difficult task of threading said fingers outwardly from the drum interiors through the holes 18. An average fowl picking machine includes about 24 drums, in two parallel rows, as described, each of which drums has eight or more picking fingers projecting therefrom. Thus the average machine utilizes approximately 200 fingers, or more. In many large scale commercial fowl processing operations two or three of said feather-picking machines will be mounted in a row, and in normal use every three to four weeks each machine must have all the picking fingers thereon shifted or replaced. With conventional picking fingers and mounting assemblies it takes from 2 to 3 hours to re-finger each machine, while with the present invention the operation can be performed in a fraction of that time.

A further important advantage of the present invention is that because the picking fingers do not have to be forced outwardly through holes provided therefor in the drums much wider picking fingers can be employed.

Figure 4:
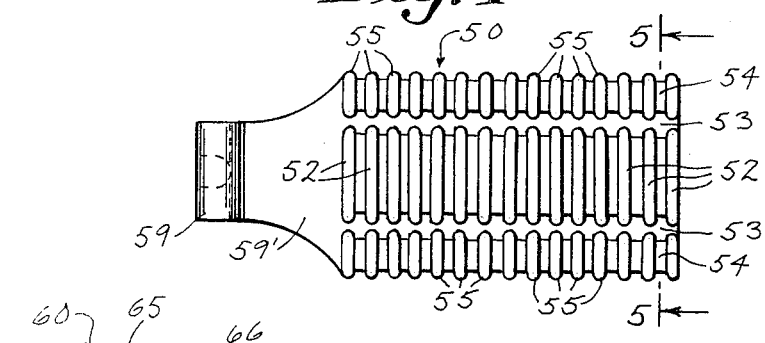
FIG. 4 is a top plan view of a modified form of picking finger.
Figure 5:
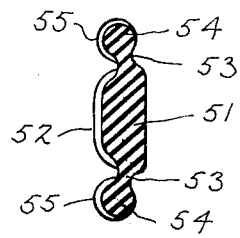
FIG. 5 is a transverse sectional view through said picking finger taken along line 5—5 of FIG. 4.

As is illustrated in FIGS. 4 and 5, within the scope of the present invention it is possible to utilize a picking finger 50 that is substantially wider than conventional picking fingers. The illustrated paddle-like finger 50 includes an intermediate body portion 51 having ribs 42, and there being narrower outer sections 54 connected to said intermediate portion by relatively thin flexible webs 53 (FIG. 5), said outer sections having protruding ribs 55 thereon. A base 59 is connected to said body by a tapered neck 59' and is similar in design and function to the base 42 featured in the picking finger of FIG. 3, said base being adapted to be releasably engaged in a bracket similar to the bracket 21. The width of said base can be varied, of course, and the invention is not to be limited to the illustrated embodiment.

With the extra wide picking finger 50 illustrated in FIGS. 4 and 5, when said paddle-like finger moves into engagement with the body of a chicken or other fowl during the feather-removing operation a substantially greater surface contact area is provided, in comparison with the contact area obtained with the relatively narrow picking fingers heretofore used. The result is that a substantially greater quantity of feathers are engaged and removed by said finger, which is especially advantageous with big birds like turkeys. In addition, the side extensions 54, 57 on said finger 50 are adapted to flex somewhat to conform to the body contour of the fowl, thus further improving the feather-engaging and picking qualities of said finger. It has been found, too, that said flexible hinge connection functions in the manner of a shock absorber when the fast-moving fingers initially strike the bird, thereby minimizing brushing or barking of the skin of said bird.

Figure 6:
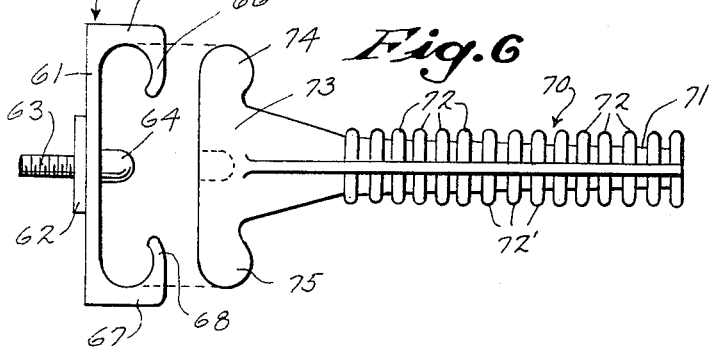
FIG. 6 is a side elevational view of a modified, reversible form of picking finger and mounting bracket.

In FIG. 6 of the drawing there is illustrated a modified form of mounting bracket 60 coming within the intended scope of the present invention. Said modified bracket includes a flat base portion 61, and at each end thereof are opposed legs 65, 66 and 67, 68 forming a finger base-receiving socket. Unlike the legs in the bracket shown in FIG. 3 which are of different lengths, as hereinabove described, the leg portions 66, 68 in said modified bracket design are of exactly the same length, thereby providing a bracket that can be mounted in either direction. A lug 62 formed on the bracket is adapted to fit within the key slot in a conventional drum hole to prevent turning movement of the bracket, and a bolt 63 projected therethrough can be utilized to mount said bracket on the drum exterior.

Figure 7:
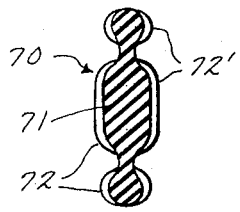
FIG. 7 is a transverse sectional view through the picking finger illustrated in FIG. 6.

As appears in FIGS. 6 and 7, the picking finger 70 designed for use with said mounting bracket 60 includes a shank 71 provided with sets of protruding ribs 72 and 72' formed on its opposite surfaces. In addition, the base 73 of said modified picking finger includes identical rounded toe portions 74, 75 at its opposite ends. Unlike the picking finger 40 illustrated in FIG. 3, which must be mounted so that the feather-engaging ribs are on the leading face thereof as said finger revolves, the modified picking finger 70 can be mounted in either direction, since both of its faces are provided with feather-engaging ribs. As a result, with the style of picking finger illustrated in FIGS. 6 and 7 if the ribs on one side thereof become worn it is merely necessary to remove and turn said finger 180° in order to present an entirely new ribbed picking surface, thus making it unnecessary to discard and replace said finger.

Referring now to FIGS. 8 and 9 of the drawing, illustrated therein is another reversible picking finger 80 having ribs 81 on both sides thereof, and having an extra wide body portion for superior picking action, as hereinabove described. In addition it will be noted that the base 82 of said finger is provided with a pair of parallel ribs 83, 84 formed along its longitudinal edges. When said finger 80 is installed in a mounting bracket said longitudinal base ribs 83, 84 are designed to fit in straddling relation on the outside of said bracket to prevent the finger from shifting laterally relative to said bracket. This style finger can either be used with a coacting element adapted to project into the recess 85 therein, such as the bolt head 26 in FIG. 3, or it can be utilized independently of such an element.

In FIGS. 10 and 11 of the drawing there is shown a modified mounting bracket 90 having a bore 91 therethrough with a countersunk top opening 92, said countersunk design being adapted to accommodate the enlarged head portion of the bolt or machine screw employed to retain said bracket on a drum. In FIG. 12 there is illustrated still another bracket 100 having a countersunk bore opening 102 which is beveled to accommodate a beveled flat head bolt or machine screw of the conventional type. Said mounting bracket 100 is especially designed for use with the picking finger 80 illustrated in FIGS. 8 and 9, wherein the parallel base ribs 83, 84 retain said finger in position without the necessity of employing a projecting round head bolt such as the bolt 26 in FIG. 3 to retain the finger against inadvertent lateral movement.

In FIG. 13 and 14 of the drawing there is disclosed a modified form of rotatable drum 110. Like the drums 10, 11 illustrated in FIGS. 1 and 2, said drum 110 is designed to be mounted on a rotatable drive shaft, said drum including a hub 111 adapted to fit closely on said shaft. Unlike said drums 10 and 11, however, wherein separable finger mounting brackets are bolted to the drum exterior surface, said drum 110 is formed of rubber or similar moldable material and has mounting brackets 112, 113 formed integrally thereon. Each of said brackets includes a pair of curved opposed legs which provide a socket adapted to removably retain the base portion of a picking finger, and as will be seen in FIG. 14 said brackets 112 and 113 are arranged in staggered, offset relationship, the brackets 112 being located adjacent one edge of said drum and the alternate brackets 113 formed adjacent the drum opposite edge.

Referring now to FIGS. 15–18 of the drawings, illustrated therein is another modified picking finger and mounting bracket design coming within the scope of the present invention. In this form of the invention the bracket 120 includes an inclined surface portion 125 adjacent the toe end 121 thereof, and the base of the finger 122 is provided with a similar inclined surface 126. Said inclined finger surface 126 is designed to bear against the corresponding inclined surface 125 of the bracket when said finger is installed therein, and during the operation of the feather-picking machine, and the resulting torque on said fingers, the angled nature of said interfitting finger and bracket member portions causes said finger to bear even more firmly against said angled bracket surface. Thus the finger is locked even more securely in place and possibility of its inadvertent separation during the picking operation is minimized.

It has been found that without the coacting inclined finger and bracket surfaces 126, 125, there is considerable stress on the instep portion 130 (FIG. 15) of the finger during the feather-picking operation which results in structural fatigue and the early deterioration of the finger.

Another novel feature incorporated in the finger 122 illustrated in FIGS. 15–18 is the provision of a locking nub 129 on the heel portion 124 of said finger, which nub is designed to snap into a complementary recess or cutout 128 in the heel portion 127 of the mounting bracket 120 when said finger is installed therein. Said interfitting nub and receiving recess provides a modified locking assembly for removably securing the finger base against inadvertent shifting or movement within the mounting bracket. Said modified locking assembly is advantageous because as the picking finger is bent backward during the feather-removing operation the locking action is actually increased. Moreover, and unlike the external locking shoulders 83 featured in the form of the invention illustrated in FIGS. 8 and 9, with said interfitting nub 129 and bracket recess 128 the entire finger base is maintained within the bracket, thus providing a neat appearance and eliminating the possibility of feathers or other matter catching on and adhering to such protruding shoulder elements.

In the form of the invention illustrated in FIGS. 19–21, inclusive, a metal drum 210 has spaced sets of legs, each set comprising a toe-receiving leg 221 and a heel-receiving leg 227. These legs are shaped like the legs of the brackets shown in FIG. 15, but instead of projecting upwardly from a separable bracket, are cast integrally with the drum. Each leg 227 has an inwardly bent end 226 with an intermediate recess 228. Each leg 221 has an inwardly hooked portion 221'. Between each pair of legs the material of the drum is dished inwardly as at 230 so as to provide a top recess 231 between each pair of legs, the top recess having a sloping portion 225 functioning similarly to the portion 125 of FIG. 15. The recess 231, being depressed below the surface of the drum, is bounded on the sides by shoulders 232.

Figure 15:
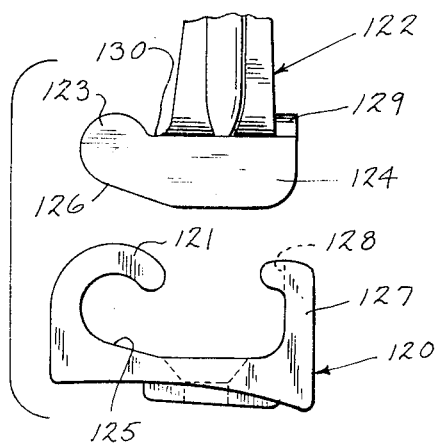
FIG. 15 is a side elevational view of another form of picking finger and mounting bracket design within the present invention, said members being shown in separated condition.
Figure 16:
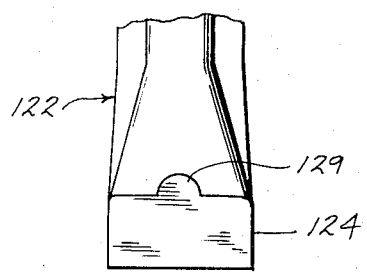
FIG. 16 is a rear elevational view of the foot portion of the picking finger of FIG. 15.
Figure 17:
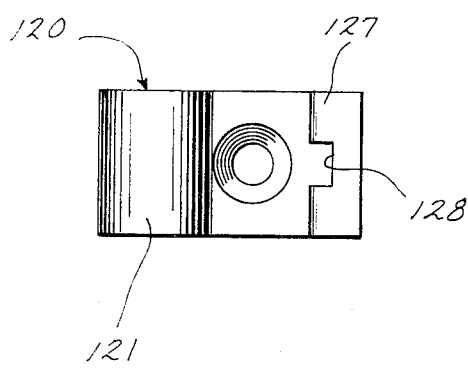
FIG. 17 is a top plan view of the mounting bracket illustrated in FIG. 15.
Figure 18:
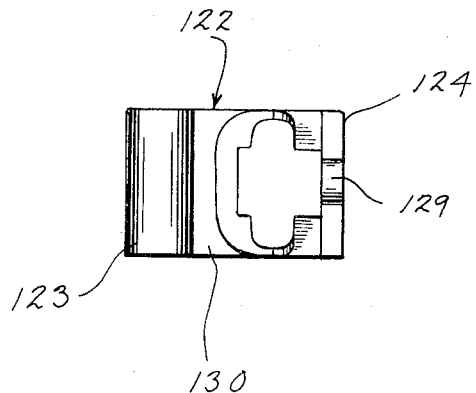
FIG. 18 is a top view of the picking finger shown in FIGS. 15 and 16.

Each holding device formed by a pair of legs is adapted to receive a finger having a base like that shown in FIGS. 15 and 16, and also in FIG. 19. A finger may be installed by inserting its curved toe portion 143 within the hooked portion 221' while flexing the heel end portion 124 of the finger base in an upward direction (see bottom of FIG. 19). Then by pushing inwardly on the heel end portion the shoulder 124' will snap beneath the inturned flange portion 226 of the leg 227 and the locking nub 129 will be guided into the recess 228. The lower portion of the base of the finger will then enter the recess 231 between the shoulders 232 and will be restrained by said shoulders, as well as by the engagement of the nub 129 with the slot 228, to prevent lateral movement and shifting of the finger base during the stresses of use, as shown at the right in FIG. 19.

As shown in FIG. 20 the sets of legs 221 and 227 may be offset laterally from one another across the width of the drum. With this arrangement the fingers may be individually installed or removed by merely snapping them into and out of engagement between the sets of legs, just as is the case with the bolted-on brackets of FIGS. 3, 6, 10 and 15.

The design of FIGS. 19–21, wherein the legs are formed integrally with the periphery of the drum, eliminates the necessity of connecting brackets by means of nuts and bolts as in FIG. 3, and eliminates the danger of such nuts and bolts getting loose. In addition, there is no need with the form of the invention of FIGS. 19–21 to gain access to the interior of the drum. Therefore, end closures 240 may be employed as shown in FIG. 20. These maintain the interior of the drum in sanitary condition and eliminate the difficulty of cleaning such interior. As indicated by the arrows in FIG. 1 the ribbed sides of the fingers face in the direction of rotation of the drums. Accordingly, in FIG. 19, the direction of rotation will be clockwise with the ribs on the fingers 122 facing the direction of rotation. This means that the legs 221 are in a lead position with respect to the direction of rotation. Thus, as the fingers engage the poultry, the pressure on each finger will be exerted in a direction to cause a tightening of the engagement of the toe portion 143 of a finger base within the hooked leg portion 221'. This, aided by the fit of the finger bases in the recesses 231 (see FIG. 21), insures that the fingers are permanently maintained in proper operative position, and are maintained against any rotating movement which might cause shifting of the ribs out of their lead position.

It is to be noted that in most of the forms of the invention the flexible finger bases provide for the snapping of individual fingers into and out of assembled position on the drums without use of nuts and bolts for holding said finger bases in position. In addition, in most of the forms of the invention there is means such as the engagement of the bolt head 26 with the recess 45 of FIG. 3, such as the engagement of the nub 129 with the recess 128 of FIG. 15, and such as the engagement of the flange base between the shoulders 232 at the sides of the recess 231, as well as the engagement of the nub 129 with the slot 228, for preventing lateral shifting of the finger during use.

From the foregoing detailed description it will be seen that the present invention provides a number of improved picking finger and mounting assemblies for use in poultry picking machines.

The principal purpose of the present invention, as hereinabove described, is to provide novel picking finger and mounting assemblies which permit the feather-picking fingers to be separately attached to the exterior of the drum in a poultry picking machine, thereby greatly speeding and facilitating the task of installing said fingers and of removing and replacing them when they become worn. In addition, said novel finger and mounting assemblies comprising the invention permit the use of wider, more effective picking fingers than have heretofore been employed. The invention is also simple and reliable in use, it is relatively inexpensive in design, and it can be easily and economically installed on existing poultry picking machines as well as incorporated on new equipment.

It is to be understood that while several forms of the present invention have been illustrated and described herein, numerous additional variations or modifications thereof may occur to those skilled in the art. What is intended to be covered herein is not only the forms of the invention disclosed, but also any and all variations or modifications thereof as may come within the spirit of said invention, and within the scope of the following claims. While the invention has special utility in connection with rotary drum type poultry picking machines, the novel finger mounting devices are obviously adapted for use on any type of finger holding surface whether in the shape of the periphery of a drum or in some other shape.

What I claim is:

1. In a machine having a finger-holding surface, a plurality of pairs of spaced outwardly projecting mounting legs carried by said surface, with each pair presenting a top access opening therebetween which is spaced outwardly from the holding surface, a flexible finger interfitting between each pair of legs, each of said fingers having a resilient base portion at one end thereof with length and width dimensions, said length dimension being greater than the corresponding dimension of said access opening, and cooperating means on said base portion and legs for removably receiving and holding a base portion between each pair of legs whereby said base portion of a finger may be inserted through the access opening from the outside only and the finger is readily removably supported in outwardly projecting position, said cooperating means including a flange on one of the legs which overhangs the holding surface and projects toward the other leg, and a projection at one end of the base portion of the finger which is shaped to snugly fit the space between the overhanging flange and the holding surface when inserted angularly from the top through the access opening, there being a projection at the other end of the base, and means on the other leg for receiving and releasably holding said last-mentioned projection when the latter is pressed toward the holding surface after the first-mentioned base projection has been engaged.

2. A machine as claimed in claim 1 in which the legs are integrally formed on the holding surface.

3. A machine as claimed in claim 1 in which the space between each pair of mounting legs is completely filled with the finger base to eliminate debris-catching areas.

4. A machine as claimed in claim 1 in which there is cooperating means between the base and holding surface for resisting lateral displacement of each finger base after it is in position.

5. A machine as claimed in claim 4 in which the means for releasably resisting lateral displacement of each finger base includes a recess in the holding surface between each pair of legs, with each recess having side shoulders between which the base fits.

6. A machine as claimed in claim 1 in which the first projection of each finger base is a toe portion, and in which the overhanging flange of one of the legs is hooked inwardly and shaped to snugly receive said projecting toe portion of the finger base, and in which the means on the other leg is an inwardly projecting flange, and in which the last-mentioned projection of the finger base is a heel portion which is shaped to snap beneath said flange in response to pressure exerted toward the finger-holding surface when the finger base is inserted through said access opening and snapped into position between a pair of legs.

7. A machine as claimed in claim 6 in which said heel portion of the finger base has a projecting nub and in which the flange of said heel receiving leg portion has an edge recess positioned to receive said nun when the finger base is in assembled position.

8. In a poultry picking machine including a rotatable drum, the improved picking finger and finger-mounting assembly comprising: a plurality of finger-mounting devices mounted on said drum periphery, each of a size to accommodate the base portion of a single picking finger, each device having opposed legs and there being a top access opening between each pair of opposed legs which is spaced outwardly from the drum periphery, a flexible finger interfitting between each pair of legs, each of said fingers having a resilient base portion at one end thereof with length and width dimensions, said length dimension being greater than the corresponding dimension of said access opening, and cooperating means on said base portion and legs for removably receiving and holding a base portion between each pair of legs whereby said base portion of a finger may be inserted through the access opening from the outside only and the finger is readily removably supported in radially outwardly projecting position, said cooperating means including a flange on one of the legs which overhangs the drum and projects toward the other leg, and a projection at one end of the base of the finger which is shaped to fit the space between said over-hanging flange and the drum periphery when inserted angularly from the top through the access opening, and a projection at the other end of the finger base, there being means on the other leg for receiving and releasably holding said last-mentioned projection when the base is pressed toward the drum periphery after the first base projection has been engaged.

9. The poultry picking machine as claimed in claim 8 in which each finger mounting device is a bracket which is removably secured on the drum.

10. A poultry picking machine as claimed in claim 8 in which there is a recess in the bottom of each picking finger base, and in which there is means projecting from the drum into said recess to removably retain the picking finger against lateral movement within the mounting bracket.

11. A poultry picking machine as claimed in claim 8 in which there is a nub on the picking finger base, and in which there is a recess in one of the legs positioned to receive said nub when the finger base is in assembled position.

12. A poultry picking machine as claimed in claim 8 in which the projection on the base of the finger which engages beneath the overhanging flange is longer than the projection at the other end and in a lead position with respect to the direction of rotation of the drum.

13. A poultry picking machine as claimed in claim 8 in which the flange on one of the legs which overhangs the drum is arcuately curved and has an inwardly-curved end, and in which the projection of the base of the finger which engages beneath said overhanging flange is similarly curved and of a size to snugly fit within the overhanging flange.

14. A poultry picking machine as claimed in claim 8 in which the legs are integrally formed on the periphery of the drum.

* * * * *